(12) United States Patent
Barzilay et al.

(10) Patent No.: US 8,335,708 B1
(45) Date of Patent: Dec. 18, 2012

(54) SYSTEM, METHOD, AND COMPUTER PROGRAM PRODUCT FOR SIMULATING A SCENARIO BASED ON INFORMATION ASSOCIATED WITH A NEW CAMPAIGN AND STORED EVENT INFORMATION

(75) Inventors: Ohad Barzilay, Haifa (IL); Erez Schachter, Brookline, MA (US)

(73) Assignee: Amdocs Software Systems Limited, Dublin (IE)

( * ) Notice: Subject to any disclaimer, the term of this patent is extended or adjusted under 35 U.S.C. 154(b) by 343 days.

(21) Appl. No.: 12/433,752

(22) Filed: Apr. 30, 2009

(51) Int. Cl.
*G06Q 10/00* (2012.01)
(52) U.S. Cl. ...................................... 705/7.29
(58) Field of Classification Search ............ 705/7.29
See application file for complete search history.

(56) References Cited

U.S. PATENT DOCUMENTS

| | | | | |
|---|---|---|---|---|
| 5,963,910 A * | 10/1999 | Ulwick | ........................ | 705/7.28 |
| 6,009,407 A * | 12/1999 | Garg | ........................... | 705/7.25 |
| 6,286,005 B1 * | 9/2001 | Cannon | ........................ | 705/14.66 |
| 7,272,575 B2 * | 9/2007 | Vega | ................................ | 705/80 |
| 7,349,827 B1 | 3/2008 | Heller et al. | ................... | 702/186 |
| 7,668,950 B2 * | 2/2010 | Horowitz et al. | ............. | 709/223 |
| 7,809,746 B2 * | 10/2010 | Jain et al. | ...................... | 707/778 |
| 7,904,327 B2 * | 3/2011 | Phelan et al. | .............. | 705/14.18 |
| 7,937,286 B2 * | 5/2011 | Newman et al. | ............. | 705/7.31 |
| 2003/0110080 A1 * | 6/2003 | Tsutani et al. | ................... | 705/14 |
| 2004/0093296 A1 * | 5/2004 | Phelan et al. | ................... | 705/36 |
| 2007/0106550 A1 * | 5/2007 | Umblijs et al. | ................. | 705/10 |
| 2008/0027788 A1 * | 1/2008 | Lawrence et al. | .............. | 705/10 |

* cited by examiner

*Primary Examiner* — Johnna Loftis
(74) *Attorney, Agent, or Firm* — Zilka-Kotab, PC (57) ABSTRACT

A system, method, and computer program product are provided for simulating a scenario based on information associated with a new campaign and stored event information. In operation, event information associated with one or more events is stored. The stored information may be related to the event parameters and the optional matches it provided. Additionally, an index is generated utilizing the stored event information. Furthermore, information associated with a new campaign is mapped to the stored event information utilizing the index. The mapping process may go beyond the exact match mechanism and expands the campaign parameters in a similar way to the actual search behavior. Still yet, a scenario is simulated based on the mapped information associated with the new campaign and the stored event information.

28 Claims, 5 Drawing Sheets

SYSTEM, METHOD, AND COMPUTER PROGRAM PRODUCT FOR SIMULATING A SCENARIO BASED ON INFORMATION ASSOCIATED WITH A NEW CAMPAIGN AND STORED EVENT INFORMATION

FIELD OF THE INVENTION

The present invention relates to simulating advertisement scenarios, and more particularly to forecasting the success of a potential campaign based on the simulation.

BACKGROUND

Advertisers are interested in presenting effective advertisements to viewers-combing many dimensions and optional values In many cases, it is desirable to determine a likelihood of success of an advertisement campaign, before the advertisement campaign is implemented. To date, techniques for determining the likelihood of success of advertisement campaigns are inefficient and/or unreliable. There is thus a need for addressing these and/or other issues associated with the prior art.

SUMMARY

A system, method, and computer program product are provided for simulating a scenario based on information associated with a new campaign and stored event information. In operation, event information associated with one or more events is stored. The stored information may be related to the event parameters and the optional matches it provided. Additionally, an index is generated utilizing the stored event information. Furthermore, information associated with a new campaign is mapped to the stored event information utilizing the index. The mapping process may go beyond the exact match mechanism and expands the campaign parameters in a similar way to the actual search behavior. Still yet, a scenario is simulated based on the mapped information associated with the new campaign and the stored event information.

DETAILED DESCRIPTION

Figure 1:
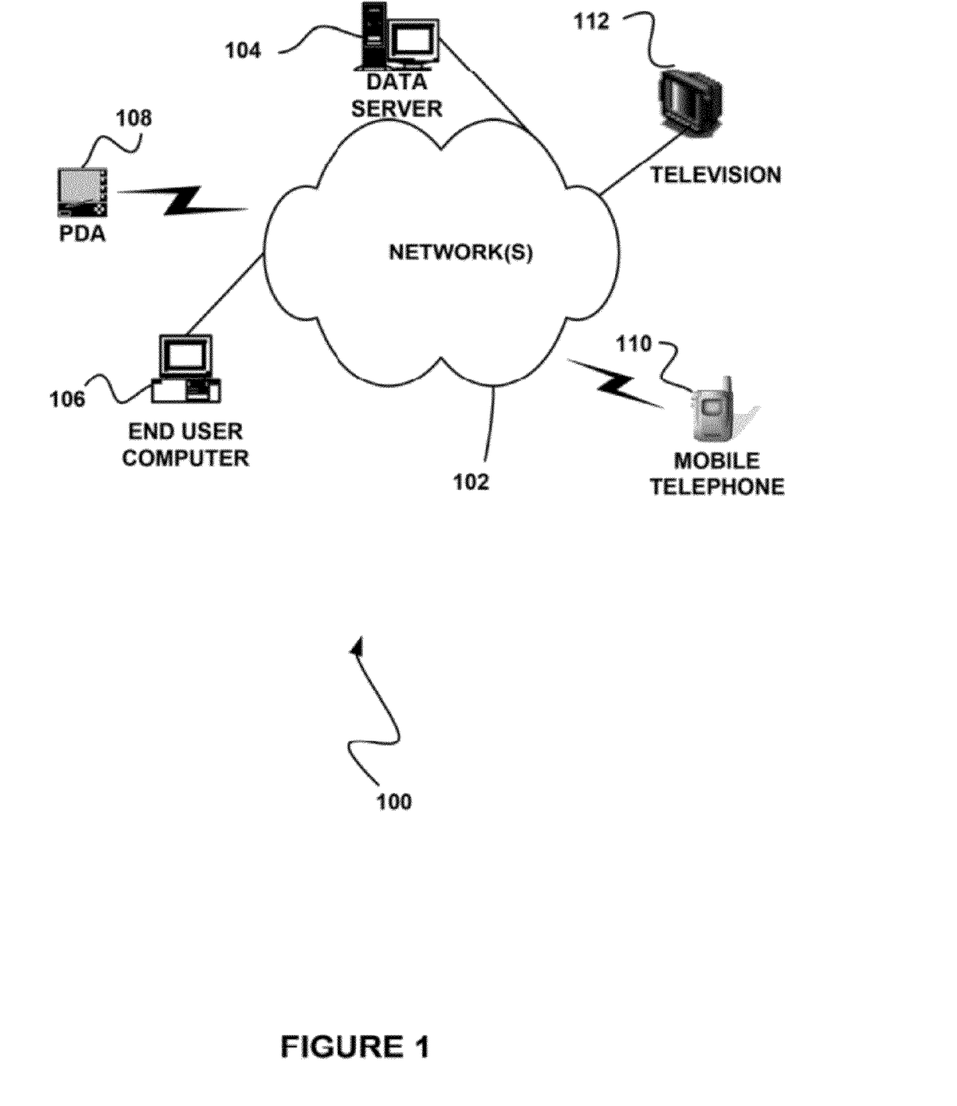
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
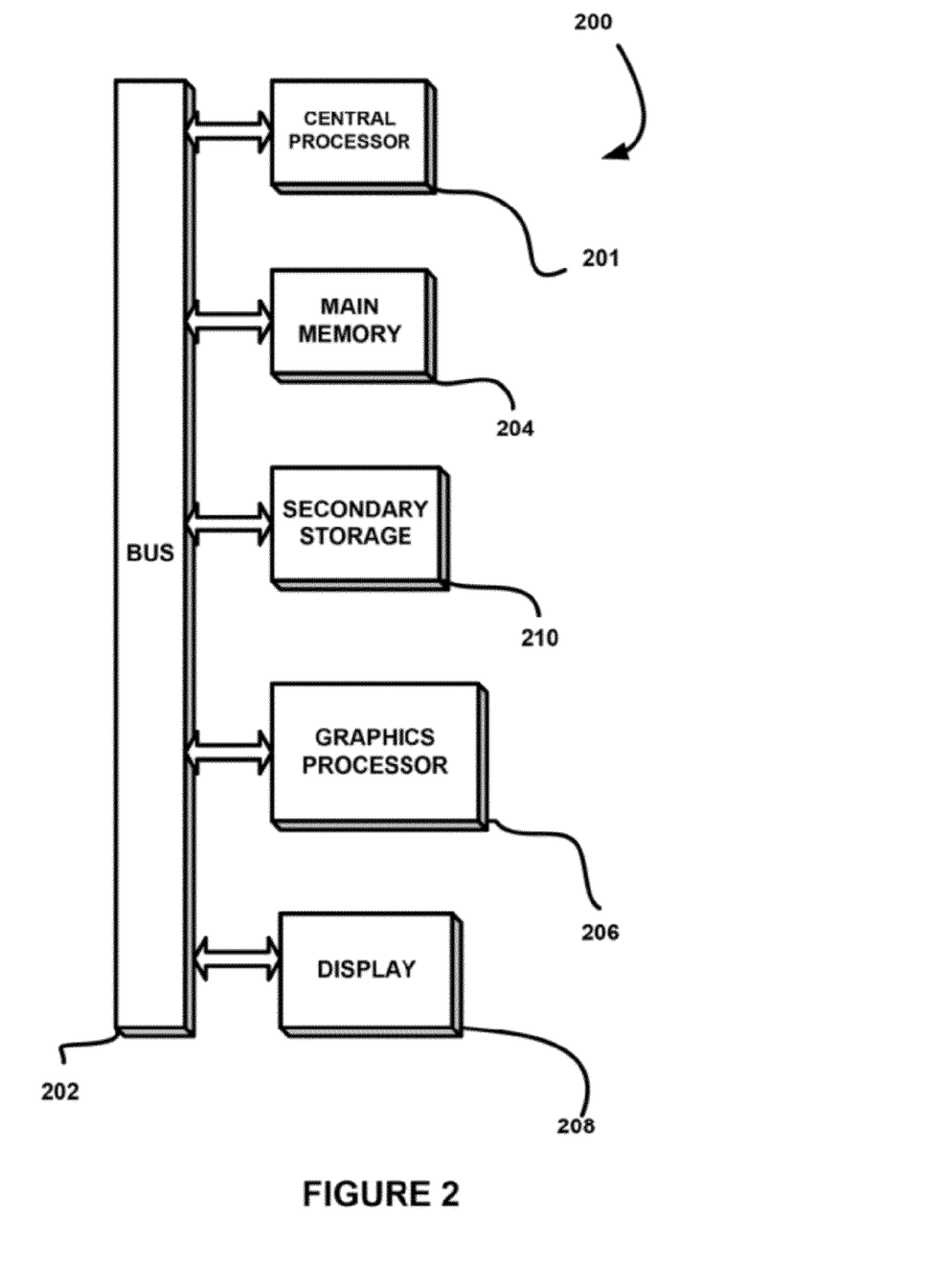
FIG. 2 illustrates an exemplary system, in accordance with one embodiment

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
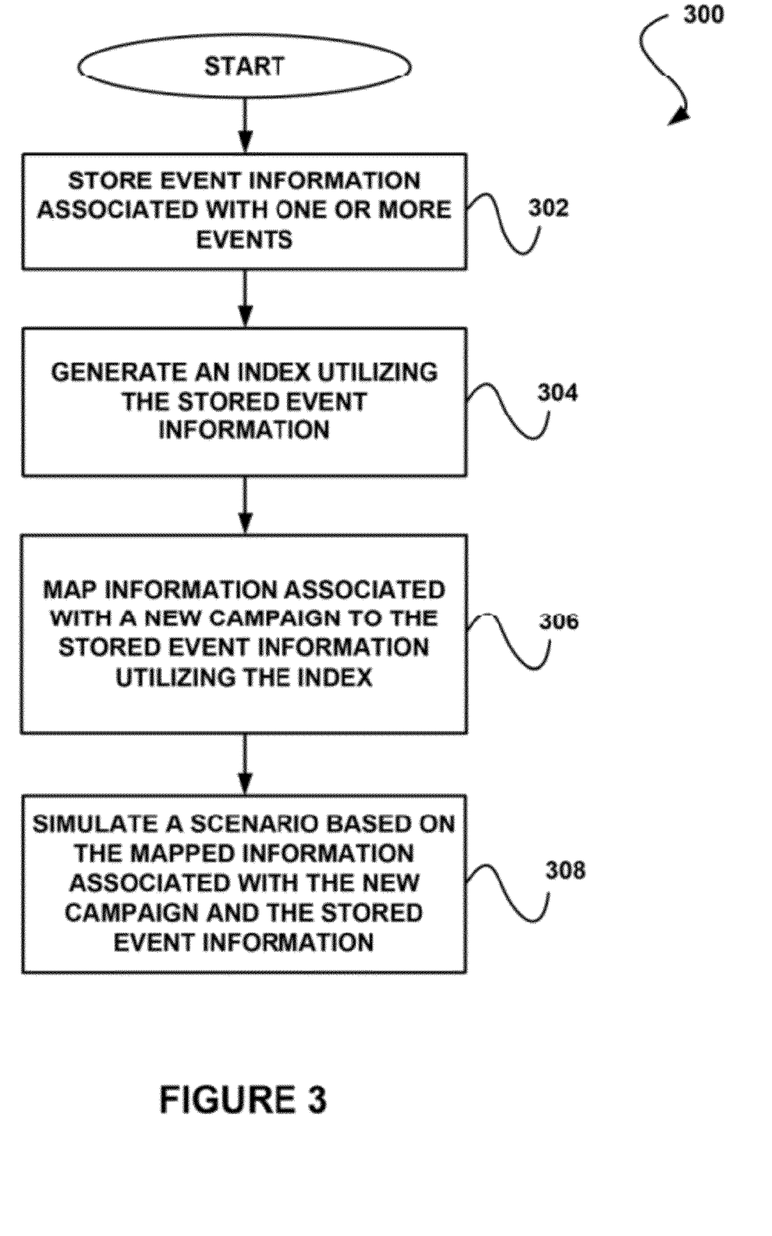
FIG. 3 shows a method for simulating a scenario based on information associated with a new campaign and stored event information, in accordance with one embodiment.

FIG. 3 shows a method 300 for simulating a scenario based on information associated with a new campaign and stored event information, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown, event information associated with one or more events is stored. See operation 302. The event information may include any information associated with an event.

In the context of the present description, an event refers to any action that triggers a request to serve a number of advertisements. For example, in various embodiments, the event may include, but is not limited to, a browsing activity, a selection, a searching activity, a purchase activity, and/or any other event that meets the above definition.

Additionally, an index is generated utilizing the stored event information. See operation 304. In this case, the stored event information may include historical event information (i.e. past event information, etc.).

In one embodiment, the index may be generated utilizing criteria associated with the one or more events. For example, the criteria may include criteria used in an advertisement request. In this case, the criteria may include any type of criteria associated with an advertisement request. In various embodiments, the criteria may include one or more of a keyword, a category, a channel (e.g. the type of communication), a location, a time frame, demographic information, device information, application, type, size etc Furthermore, information associated with a new campaign is mapped to the stored event information utilizing the index. See operation 306. In the context of the present description, a new campaign refers to any new or proposed advertisement campaign. In this case, a campaign refers to one or more operations, actions, and/or items designed to bring about a particular result. Furthermore, an advertisement refers to any item for calling something to the attention of one or more viewers.

Still yet, a scenario is simulated based on the mapped information associated with the new campaign and the stored event information. See operation 308. In this case, simulating the scenario may include applying the stored event information to the new campaign, utilizing the mapping facilitated by the index. In one embodiment, simulating the scenario may include simulating how competing advertisements are being matched when serving an advertisement.

Additionally, in one embodiment, mapping the information associated with the new campaign may include mapping campaign parameters to the event information. In another embodiment, mapping the information associated with the new campaign may further include expanding the campaign parameters to match the stored event information. In this case, the stored information may be associated with one or more relevant events corresponding to the new campaign. Furthermore, in one embodiment, the expanding may include mapping a structured query with at least one of a structured or unstructured content.

In another embodiment, the mapping may include mapping the information associated with the new campaign against the stored event information as a search query. As an option, relevant search queries may be filtered. Furthermore, as an option, related searches may be matched based on at least one of a context or profile.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
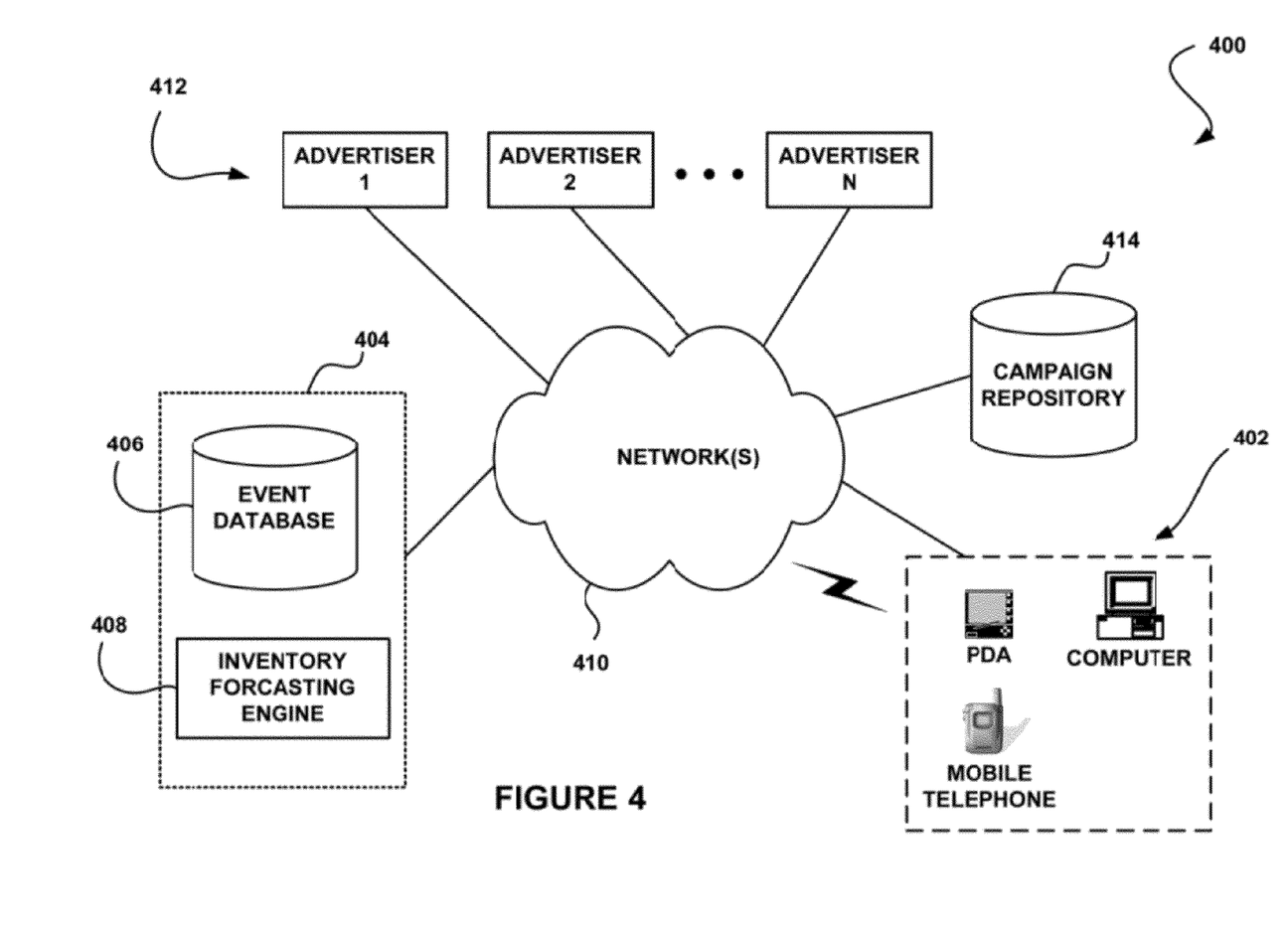
FIG. 4 shows a system for simulating a scenario based on information associated with a new campaign and stored event information, in accordance with one embodiment.

FIG. 4 shows a system 400 for simulating a scenario based on information associated with a new campaign and stored event information, in accordance with one embodiment. As an option, the system 400 may be implemented in the context of the details of FIGS. 1-3. Of course, however, the system 400 may be implemented in any desired environment. Again, the aforementioned definitions may equally apply to the description below.

As shown, the system 400 may include one or more user devices 402. The user devices 402 may be in communication with a forecasting subsystem 404 including an event database 406 and an inventory forecasting engine 408 over one or more networks 410. In this case, the inventory forecasting engine 408 may represent computer code embodied on a tangible storage medium. In another embodiment, the event database 406 and an inventory forecasting engine 408 may be combined.

Additionally, one or more advertiser servers 412 may have access to the event database 406, the inventory forecasting engine 408, and a campaign repository 414. It should be noted that, although the forecasting subsystem 404 and the campaign repository 412 are shown as remote isolated items, in another embodiment, the forecasting subsystem 404 and the campaign repository 414 may be part of or associated with the one or more advertiser severs 412.

Using the system 400, an indexing and mapping method may be implemented to store end users historical events (e.g. searching, browsing an article, using a printed advertisement, etc.) together with the current advertisement campaign repository 414 in order to enable a real time simulation of a new potential advertisement campaign. In this case, a simulation may be used to expose the potential of an advertisement being relevant and/or effective towards target users, as well as competing advertisements.

In this way, the system 400 may be utilized for the forecasting of a dynamic inventory. For example, advertisers associated with the advertisement servers 412 may be interested in presenting advertisements to users of the user devices 402. The users may provide an opportunity for relevant advertisements based on various criteria such as who the users are (e.g. name, age, ethnicity, etc.), where the users are located, reactions by the user at the moment of the advertisement presentation, and what the user is looking for based on a search query or browsing activity.

As an example, a 30 year old male in Manhattan may read an article about golf, look for golf shoes online, or open a magazine or yellow pages book with an interest in the golf products section. In this case, the forecasting deals with a dynamic environment. Thus, in this case, determining information about the user and the interest of the user may be hard in order to commit for the opportunity.

Additionally, in this case, there is not a single isolated piece of inventory to book and control. Each advertiser has its own combination of dimensions to target a user, which may be overlapping across users and behaviors. For example, in one case, an advertiser may want to target an advertisement for several keywords and within one mile around a specific user point. In another case, an advertiser might be interested in targeting other keywords and another location but with some overlap. In most cases, there is not straight forward way to manage both inventories, as well as to evaluate the basics of the price based on merging inventory supply of users and the demand of the advertisers to place ads.

In one embodiment, the inventory forecasting engine 408 may be utilized to predict the opportunity for exposure of advertisements and expected actions, and to calculate the correct parameters to later deliver commitments to the advertisers 412. In many cases, forecasting includes dealing with multiple dimensions of a targeted audience and the targeting advertiser, where every advertiser has its own parameter combination, potentially a unique list.

Furthermore, there may be overlapping between different combinations. Additionally, each dimension may have multiple options which exponentially increase the number of options to address. Still yet, many different parameter combinations may be related to very small sets of targeted audience.

As an option, forecasting may be implemented by sampling the data and building targeted sets of dimensions with counts. In this case, it is hard to build objects and to count their availability as advertisers may want to target arbitrary combinations of user profiles, context, or search keywords. Thus, counting and managing sets of dimensions may be challenging by sampling the data and building targeted sets of dimensions with counts.

As another option, forecasting may be implemented by the simulation of an audience advertiser match. Another way is to perform a simulation with a large enough sample of historical events including a competing advertiser campaign to match a new campaign opportunity and get a clear picture of a "what if" scenario. In this way, the new proposed set of dimensions may be simulated with the actual traffic and with the consideration of other advertisers. In some cases, however, the size of simulation may be large to use enough events.

Additionally, in one embodiment, the system 400 may be utilized to implement a specific indexing method that enables a simulation to be folded into a single look up/request from a database or search engine without running an entire set of user events as a full real simulation may demand. In this case, the data of events prepared for a reverse match may be organized to evaluate an opportunity for a new campaign. As an option, events may be stored as data and campaigns may be matched against the data as search queries.

Additionally, the campaigns that are related to each event may be collected by matching events with the updated database of campaigns and summaries and/or compressing the campaigns to be linked from that indexed event. In one embodiment, the event attributes may be mapped to the campaign attributes so they will be correlated. This may include a one to many relation of a campaign attribute. Still yet, the relevant events matching the potential campaign may be collected for evaluating the opportunity and measuring the available inventory each campaign leaves free, as well as the total. This may be performed to support a new booking.

As noted above, in one embodiment, the forecasting technique may be based on a reverse indexing approach. In the context of the present description, reverse indexing means that the forecasting engine 408 may build an index based on the actual advertisement request events, using the historical events. An event refers to any action that triggers a request to serve a number of advertisements.

In operation, the forecasting engine 408 may index every event using any or all of the criteria of the event that was used while requesting the advertisement(s) in the specific request. In various embodiments, the event defined criteria may have multiple dimensions such as a keyword, category, channel, location, time frame, demographic information, device information, application, type, size etc.

In this case, simulating a new campaign may query the forecasting engine 408 to receive the opportunity of an inventory of users relevant to such campaign, while considering the optional commitments that the system can provide to the specific campaign. The forecasting engine 408 may then simulate a scenario where the new proposed campaign is part of the data set of the actual advertisers, serving the same traffic of events.

The traffic of events may be taken from a history of user events, predicting that similar user events will occur in the future. In one embodiment, the traffic of events may also be compressed. In this case, two events that are similar in input data that is relevant for potential advertisement match may be combined as one with a multiplier weight that will ensure more inventory availability exists.

In one embodiment, all the campaign parameters may be mapped and expanded to match the relevant events that are related to the new advertisement. As an option, this may be performed to simulate how the competing advertisements will be matched when serving an advertisement. In one embodiment, the expansion may include mapping between items and matching a structured query with structured/unstructured content.

Based on all the optional events and the previous commitments to others campaigns, the forecasting engine 408 may provide an answer as a result of the simulation. In one embodiment, this result may include availabilities for the new campaign. This result will be accurate and may be provided in seconds when the period of history events is large enough and the future events are similar in nature.

As an option, observing the level of opportunity may be used to control the commitment and to plan for how much of the inventory should be outsourced. This may be the case where the inventory cannot be sold. As another option, a pricing scheme may be built on top of a supply and demand analysis.

Figure 5:
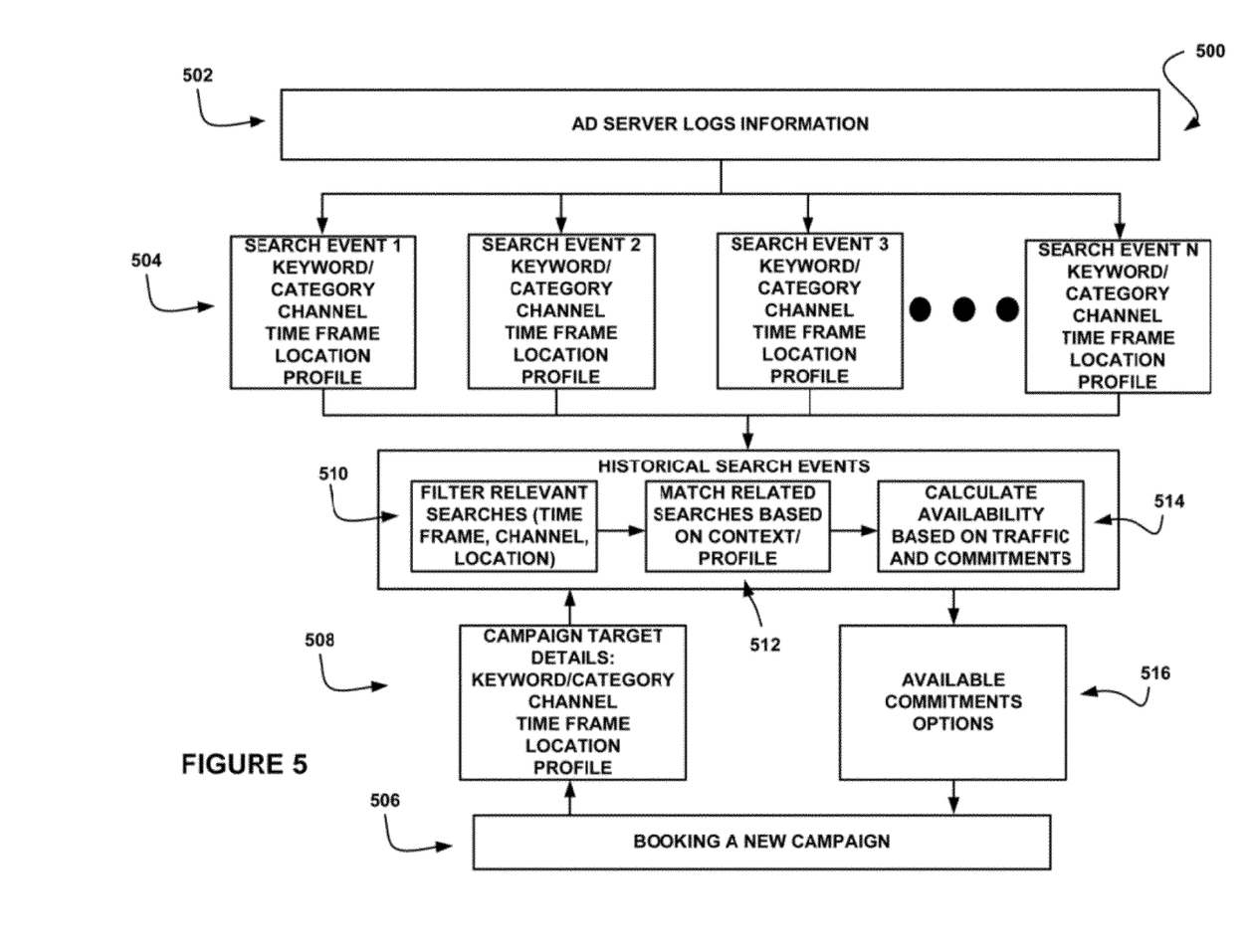
FIG. 5 shows a flow diagram for simulating a scenario based on information associated with a new campaign and stored event information, in accordance with one embodiment.

FIG. 5 shows a flow diagram 500 for simulating a scenario based on information associated with a new campaign and stored event information, in accordance with one embodiment. As an option, the flow diagram 500 may be implemented in the context of the details of FIGS. 1-4. Of course, however, the flow diagram 500 may be implemented in any desired environment. Once again, the aforementioned definitions may equally apply to the description below.

As shown, an advertisement server logs information associated with events. See operation 502. Relevant information associated with these events is then stored in a historical search events database. See operation 504. In various embodiments, the information may include one or more of a keyword/category, channel, a time frame, a location, and/or a profile.

An advertiser may then decide to book a new campaign. See operation 506. As part of this operation, the advertiser may desire to apply historical event data against the new campaign, as part of a simulation.

Thus, target details may be provided for a search of the event database. See operation 508. In various embodiments, these details may include one or more of a keyword/category, a channel, a time frame, a location, and a profile, etc.

Relevant searches are then filtered based on the details (e.g. keyword/category, a channel, a time frame, a location, and a profile, etc.). See operation 510. Related searches are then matched based on the context and/or profile. See operation 512. These operations may include expansions of the campaign parameter to match all the related historical events (i.e. not be limited to the exact match only).

An availability is then calculated based on traffic and commitments. See operation 514. Subsequently, available commitment options are presented. See operation 516.

As an example implementation, on Sunday at 9:35 a.m., a 27 year old male may navigate to a sports news portal using his mobile handset looking for information. This event is a potential action to be served by an advertiser. The event that is created by the user may be represented in a forecasting engine as an example (e.g. among many other examples) to an inventory that may create a demand by advertisers that target a specific audience.

This event may be stored in a database associated with the forecasting engine as a data record to be matched as part of the solution opportunity evaluation process. As another option, the event may share a data record with other similar events using compression. The forecasting engine may store all the relevant information of this event in the database, such as gender (male), age (27), time frame (Sunday morning), and channel (mobile).

The forecasting engine may then be utilized to determine the opportunity for a campaign targeting a specific set of users. For example, if the advertiser is targeting sports readers between 20 and 30 years old, the advertiser should match this event among others to calculate the opportunity per time frame. In this example, the forecasting engine may determine how to match a 20-30 year old age range with a 27 year old age by either expanding the search options (e.g. include internally a Boolean query with 20 OR 21 OR 22, etc. to match the age section) or the data records (e.g. by indexing the age 27 and also a 20-30 block of ages.).

The forecasting engine may also be able to determine for each unique opportunity what level the opportunity is relevant and how much the opportunity is already booked by previous commitments. In the current example, as an option, two potential campaigns may be matched resulting in only one advertisement slot.

For example, the first campaign may be set to be delivered 20% of the time it is matched relevant to an event, and the second campaign may be set to be delivered 40% of the time it is matched relevant to an event. In this case, a 60% "booked" value may be attached to this event. That means that 40% is still free and may contribute to a summary of opportunities to be committed to the new subject campaign.

The forecasting engine may collect all the related events that serve this campaign in a selected time frame, sum the potential free space (e.g. 40% in this case), and calculate the total free opportunity. For this example, if there are ten events in a given week, and if all are exactly the same, the forecasting engine may return with an answer of four (i.e. 40%*10) as an optional commitment, which means that the campaign may be committed to appear four times in the upcoming week.

While various embodiments have been described above, it should be understood that they have been presented by way of example only, and not limitation. For example, the aforementioned descriptions may be applied generally to forecasting capabilities as well as advertiser simulation. The systems and methods described herein may be implemented in the context of any system that face similar needs and challenges as advertiser simulation. Thus, the breadth and scope of a preferred embodiment should not be limited by any of the above-described exemplary embodiments, but should be defined only in accordance with the following claims and their equivalents.

What is claimed is:

1. A method, comprising:
   storing historical event information including details of one or more historical events, the one or more historical events including one or more actions that trigger a request to serve one or more advertisements, and the historical event information including one or more of a keyword, a channel, a time frame, a location, and a profile;
   generating an index utilizing the one or more of the keyword, the channel, the time frame, the location, and the profile of the one or more historical events;
   mapping information associated with a new campaign to the stored historical event information utilizing the index; and
   utilizing a processor, simulating a scenario based on the mapped information associated with the new campaign and the stored historical event information by applying the stored historical event information to the new campaign, utilizing the mapping facilitated by the index, for exposing a potential relevance of an advertisement of the new campaign to at least one of target users and competing advertisements.

2. The method of claim 1, wherein the index is generated utilizing criteria associated with the one or more historical events.

3. The method of claim 2, wherein the criteria includes criteria used in an advertisement request.

4. The method of claim 3, wherein the criteria includes the keyword.

5. The method of claim 3, wherein the criteria includes a category.

6. The method of claim 3, wherein the criteria includes the channel.

7. The method of claim 3, wherein the criteria includes the location.

8. The method of claim 3, wherein the criteria includes the time frame.

9. The method of claim 3, wherein the criteria includes demographic information.

10. The method of claim 1, wherein simulating the scenario includes simulating how the competing advertisements are being matched when serving the one or more advertisements.

11. The method of claim 1, wherein mapping the information associated with the new campaign includes mapping campaign parameters to the stored historical event information.

12. The method of claim 11, wherein mapping the information associated with the new campaign further includes expanding the campaign parameters to match the stored historical event information.

13. The method of claim 12, wherein the stored historical event information is associated with one or more relevant events corresponding to the new campaign.

14. The method of claim 12, wherein the expanding includes mapping a structured query with at least one of a structured or unstructured content.

15. The method of claim 1, wherein the mapping includes mapping the information associated with the new campaign against the stored historical event information as a search query.

16. The method of claim 15, further comprising filtering relevant search queries.

17. The method of claim 16, further comprising matching related searches based on at least one of a context or profile.

18. The method of claim 1, wherein the one or more historical events include a network browsing activity.

19. The method of claim 1, wherein mapping the information associated with the new campaign includes expanding one or more parameters of the new campaign to match the stored historical event information.

20. The method of claim 1, wherein the simulating is performed utilizing a single request to a database or search engine.

21. The method of claim 1, wherein the historical event information further includes one or more of gender of a user associated with the historical event and age of the user associated with the historical event.

22. The method of claim 1, wherein multiple events with similar event information are combined in the index as one event with a multiplier weight.

23. The method of claim 12, wherein the expanding of the campaign parameters to match the stored historical event information includes generating a Boolean query.

24. The method of claim 1, wherein a first campaign having a first delivery rate is matched to one of the historical events, and a second campaign having a second delivery rate is matched the one of the historical events, and the first delivery rate and the second delivery rate are utilized to determine a rate of free opportunities available for commitment to the new campaign with respect to the one of the historical events.

25. The method of claim 24, wherein the first campaign, the second campaign, and the new campaign are all matched to the one of the historical events.

26. The method of claim 1, wherein mapping the information associated with the new campaign to the stored historical event information includes correlating attributes of the new campaign with attributes of the historical events to identify the historical events that are relevant to the new campaign, and wherein simulating the scenario based on the mapping includes:
   identifying each of the historical events that are relevant to the new campaign as an opportunity for the new campaign, for each of the identified opportunities, determining a level of the opportunity that is available for use by the new campaign based on usage of the opportunity by other campaigns, and calculating a total available opportunity for the new campaign based on the levels of the opportunities that are determined to be available;

wherein a future opportunity for exposure of the advertisement of the new campaign is forecasted as the total available opportunity for the new campaign calculated from the simulation.

27. A computer program product embodied on a non-transitory computer readable medium, comprising:

computer code for storing historical event information including details of one or more historical events, the one or more events including one or more actions that trigger a request to serve one or more advertisements, and the historical event information including one or more of a keyword, a channel, a time frame, a location, and a profile;

computer code for generating an index utilizing the one or more of the keyword, the channel, the time frame, the location, and the profile of the one or more historical events;

computer code for mapping information associated with a new campaign to the stored historical event information utilizing the index; and computer code for simulating a scenario based on the mapped information associated with the new campaign and the stored historical event information by applying the stored historical event information to the new campaign, utilizing the mapping facilitated by the index, for exposing a potential relevance of an advertisement of the new campaign to at least one of target users and competing advertisements.

28. An apparatus, comprising:

a database for storing historical event information including details of one or more historical events, the one or more historical events including one or more actions that trigger a request to serve one or more advertisements, and the event information including one or more of a keyword, a channel, a time frame, a location, and a profile; and a processor for:

generating an index utilizing the one or more of the keyword, the channel, the time frame, the location, and the profile of the one or more historical events;

mapping information associated with a new campaign to the stored historical event information utilizing the index; and simulating a scenario based on the mapped information associated with the new campaign and the stored historical event information by applying the stored historical event information to the new campaign, utilizing the mapping facilitated by the index, for exposing a potential relevance of an advertisement of the new campaign to at least one of target users and competing advertisements.

* * * * *